(12) United States Patent
Kaiser et al.

(10) Patent No.: US 12,454,304 B2
(45) Date of Patent: Oct. 28, 2025

(54) LINEAR ACTUATOR FOR REAR AXLE STEERING ON A MOTOR VEHICLE

(71) Applicant: Schaeffler Technologies AG & Co. KG, Herzogenaurach (DE)

(72) Inventors: Benjamin Kaiser, Pommersfelden (DE); Mario Arnold, Aurachtal (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 485 days.

(21) Appl. No.: 17/802,206

(22) PCT Filed: Feb. 8, 2021

(86) PCT No.: PCT/DE2021/100117
§ 371 (c)(1),
(2) Date: Aug. 25, 2022

(87) PCT Pub. No.: WO2021/175362
PCT Pub. Date: Sep. 10, 2021

(65) Prior Publication Data
US 2023/0356769 A1  Nov. 9, 2023

(30) Foreign Application Priority Data
Mar. 4, 2020  (DE) .................. 10 2020 105 795.4

(51) Int. Cl.
*B62D 5/04* (2006.01)
*G01D 5/20* (2006.01)

(52) U.S. Cl.
CPC ......... *B62D 5/0427* (2013.01); *B62D 5/0445* (2013.01); *G01D 5/202* (2013.01)

(58) Field of Classification Search
CPC .... B62D 5/0427; B62D 5/0445; G01D 5/202; G01D 5/2026
USPC .................................. 324/207.24, 207.11, 200
See application file for complete search history.

(56) References Cited

U.S. PATENT DOCUMENTS

| 10,563,742 B2* | 2/2020 | Daniel | F16H 25/24 |
| 2011/0061481 A1* | 3/2011 | Zimmermann | F24S 30/452 |
| | | | 74/89.23 |
| 2011/0120300 A1* | 5/2011 | Fletcher | F15B 15/2861 |
| | | | 29/888.021 |
| 2012/0304788 A1* | 12/2012 | Morgan | B64C 25/50 |
| | | | 74/89.42 |
| 2019/0212170 A1* | 7/2019 | Krone | G01D 5/145 |

(Continued)

FOREIGN PATENT DOCUMENTS

| CN | 102498366 A | 6/2012 |
| CN | 105814407 A | 7/2016 |

(Continued)

*Primary Examiner* — Giovanni Astacio-Oquendo (57) ABSTRACT

The disclosure relates to a linear actuator, the housing of which encloses a pushrod which is guided displaceably along a longitudinal axis. The linear actuator includes a linear travel sensor intended for determining a position of the pushrod. A housing-side position receiver of the linear travel sensor includes a receiver section extending along the longitudinal axis, and a pushrod-side position transmitter that interacts contactlessly with the position receiver. The position transmitter is made from an electrically conductive material, and a transmitter contour of the linear travel sensor is curved about at least one dimensional axis.

20 Claims, 9 Drawing Sheets

(56) References Cited

U.S. PATENT DOCUMENTS

| | | | |
|---|---|---|---|
| 2021/0079938 A1* | 3/2021 | Yasui | F16H 25/2015 |
| 2023/0085265 A1* | 3/2023 | Shin | B62D 5/0445 |
| | | | 180/444 |
| 2025/0002085 A1* | 1/2025 | Johansson | B62D 15/0225 |

FOREIGN PATENT DOCUMENTS

| | | |
|---|---|---|
| CN | 106574850 A | 4/2017 |
| CN | 106958401 A | 7/2017 |
| CN | 109565215 A | 4/2019 |
| DE | 3940894 A1 | 6/1991 |
| DE | 10157120 A1 | 6/2002 |
| DE | 102009043758 A1 | 5/2010 |
| DE | 102010056271 A1 | 6/2012 |
| DE | 102014220458 A1 | 4/2016 |
| DE | 102017208101 A1 | 11/2018 |
| EP | 0170723 A1 | 2/1986 |

\* cited by examiner

LINEAR ACTUATOR FOR REAR AXLE STEERING ON A MOTOR VEHICLE

CROSS-REFERENCE TO RELATED APPLICATIONS

This application is the U.S. National Phase of PCT Application No. PCT/DE2021/100117 filed on Feb. 8, 2021, which claims priority to DE 10 2020 105 795.4 filed on Mar. 4, 2020, the entire disclosures of which are incorporated by reference herein.

TECHNICAL FIELD

The present disclosure relates to a linear actuator, in particular for a rear axle steering on a motor vehicle.

BACKGROUND

From DE102017208101 A1 a linear actuator for a rear axle steering on a motor vehicle has become known. A pushrod guided displaceably along a longitudinal axis in a housing is driven by an electric motor. The pushrod engages wheel carriers in this application.

A magnetic-inductive linear travel sensor for determining a position of the pushrod is provided with a position receiver arranged on the housing side, which comprises a receiver section extending along the longitudinal axis. This receiver section covers the actuating range of the linear actuator. The linear travel sensor is further provided with a position transmitter associated with the pushrod and referred to as a sensor pulse transmitter. The position transmitter is designed as a permanent magnet that is attached to the pushrod by means of an expansion element.

The magnet of the magnetic inductive linear travel sensor required for the position transmitter is expensive. At high ambient temperatures, there is a risk of undesirable demagnetization, for example if the exhaust pipes of the motor vehicle pass close to the linear actuator and the magnet is heated to an inadmissible degree. The magnet must also have its poles precisely aligned for proper measurement.

SUMMARY

The object of the present disclosure is to provide a linear actuator which is easy to manufacture and enables an accurate position detection of the pushrod.

This object is achieved by the linear actuator described herein.

A housing of the linear actuator encloses a pushrod which is guided displaceably along a longitudinal axis. The pushrod penetrates the housing and is connected at its ends via coupling elements to steerable wheel carriers that support the wheels. By moving the pushrod, the wheels are steered to a desired position.

For applications of the linear actuator in a rear axle steering on a motor vehicle according to the disclosure, an electric motor can be used, which can be arranged inside or outside of the housing. The drive connection between the electric motor and the pushrod is can be provided by means of a toothed belt drive and a screw drive. The screw drive converts a rotational movement of its nut into a translational movement of its threaded spindle, which is usually part of the pushrod.

Furthermore, an inductive linear travel sensor is provided for determining a position of the pushrod. Inductive sensors basically work with an inductance of the position receiver. A magnetic field is generated and the position transmitter changes the field. This measuring principle allows for the contactless and wear-free measurement of paths and distances. The coil usually emits a magnetic field as part of an oscillating circuit/oscillator, which causes eddy currents in the passing, electrically conductive position transmitter. The amplitude and frequency of the oscillating circuit change. The measuring accuracy of the linear travel sensor can be increased here if several coils are used.

A position receiver arranged on the housing side is provided with a receiver section which can be provided with a plurality of, for example, imprinted coils which generate the magnetic field. The receiver section is arranged parallel to the pushrod and covers a measuring range corresponding to the actuating range of the pushrod. The position receiver generates a magnetic field.

A position transmitter, also referred to as a target, interacting with the position receiver is associated with the pushrod. The position transmitter can be made up of several parts and can be fixed to the pushrod by means of a bracket, for example. A proper mounting of the position transmitter on the pushrod is required for good position detection.

The position transmitter has metallic sections or is formed of metal and is electrically conductive, but, unlike in the case of magnetic-inductive sensors, is not magnetized. If the position transmitter passes through the receiver section of the position receiver, the amplitude and the frequency of the oscillating circuit are changed and the inductance changes. Based on these changes, a proper position detection of the pushrod can be performed.

The pushrod is displaced along its axis but, due to its constructive design, can experience further unwanted deflections as a result of forces acting on the pushrod. Forces are transmitted axially and transversely to the pushrod via the drive connection between the motor and the pushrod. The pushrod can be subjected to external forces, which are introduced via the connected wheel carriers, for example. All of these acting forces can lead to undesired deflections of the pushrod in one or more dimensional axes for system-related reasons. Although the position transmitter can be manufactured inexpensively and is insensitive to heating, a precise position of the position transmitter in relation to the position receiver is desirable for an optimized measurement result.

It is technically very complex to avoid such unwanted deflections of the pushrod in each dimensional axis. The disclosure has recognized that it can be sufficient to provide a transmitter contour of the position transmitter that is curved about at least one dimensional axis. This curvature around a dimensional axis is adapted to a possible undesired deflection of the pushrod around this dimensional axis. This eliminates the need for complex constructive measures to prevent any undesirable deflection of the pushrod. It is enough to shape the position transmitter in the appropriate way.

For example, a piece of sheet metal can be used as a position transmitter or target that can be easily shaped into a desired contour.

If, for example, the largest unwanted deflections are expected around a dimensional axis that is arranged transverse to the pushrod and transverse to the sensor surfaces, it is sufficient to provide the position transmitter with a transmitter contour that is curved around this dimensional axis. This curvature can be circular in this case and can be formed on a cylindrical pin, the end face of which facing the receiver section and its circular peripheral surface form the transmitter contour. In this case, the transmitter surface can be planar and arranged parallel to the longitudinal axis.

In more general terms, the transmitter contour can be formed by a transmitter surface facing the receiver section and by a peripheral contour delimiting the transmitter surface, wherein the transmitter surface and/or the peripheral contour are curved about one or more of the dimensional axes.

The peripheral contour can be curved about the dimensional axis arranged transverse to the longitudinal axis in cases where tilting of the pushrod is expected. The curvature contributes to the fact that under this tilting of the pushrod, the changes in distance in the region of the sensor surfaces are significantly smaller, thus avoiding any interference with the sensor.

In the event that undesirable deflections of the pushrod about its longitudinal axis are expected, it is expedient if the transmitter surface is curved about a dimensional axis parallel to the longitudinal axis. This dimensional axis can coincide with the longitudinal axis of the pushrod and the transmitter surface can be designed to be partially cylindrical.

The transmitter surface can alternatively or additionally be curved about a dimensional axis arranged transverse to the longitudinal axis. In the latter case, the transmitter surface is designed to be convexly crowned. In this case, tilting of the pushrod and rotation about its longitudinal axis do not influence the measurement results of the linear travel sensor, or influence them only to a negligible extent.

The position transmitter can have a pin projecting transversely from the pushrod, the free front end of which is provided with the transmitter contour. The pin can be cylindrical and its free end face can form the planar or convex transmitter surface delimited by the circular peripheral contour.

The pin can engage in a housing-side longitudinal groove of the linear travel sensor. Depending on the application, it can be useful to guide the pin in the longitudinal groove by means of a bearing in the longitudinal direction.

BRIEF DESCRIPTION OF THE DRAWINGS

The disclosure is explained in more detail below with reference to seven figures of a total of 22 figures. In the figures.

DETAILED DESCRIPTION

Figure 1:
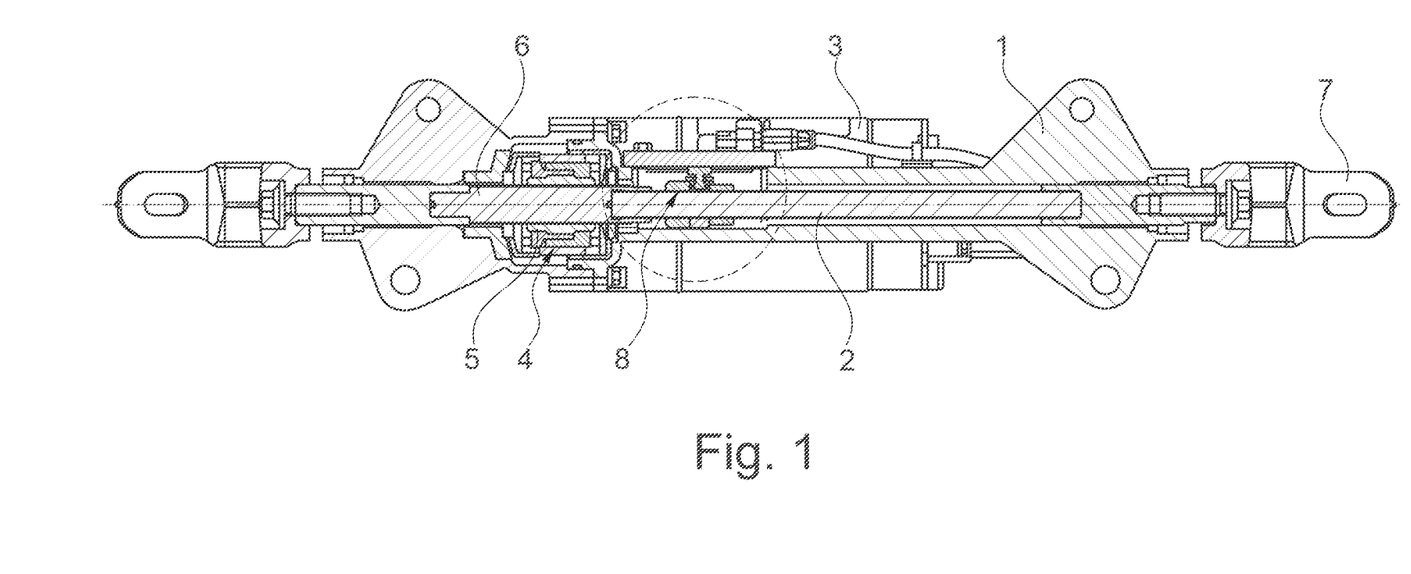
FIG. 1 shows a longitudinal section through a linear actuator of a rear axle steering on a motor vehicle.

FIG. 1 shows a longitudinal section through a linear actuator of a rear axle steering on a motor vehicle. The linear actuator has a housing 1 in which a pushrod 2 is guided displaceably along a longitudinal axis. The pushrod 2 penetrates the housing 1 at its ends, onto which heads or fork heads 7 are screwed to accommodate wheel control arms, which are not shown.

An electric motor 3 drives a screw drive 4 by means of a toothed belt not shown in more detail here, the nut 5 of which is driven in rotation by the toothed belt. The nut 5 engages with a threaded spindle 6, which is part of the pushrod 2. When the nut 5 rotates, the threaded spindle 6, i.e., the pushrod 2, is displaced along its longitudinal axis relative to the housing 1.

Figure 2:
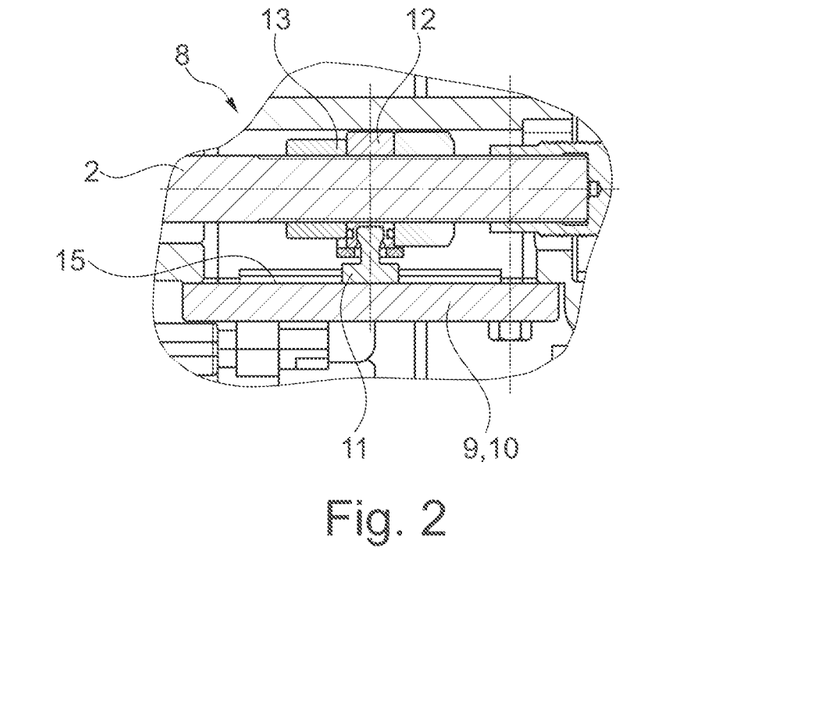
FIG. 2 shows an enlargement of the section of FIG. 1.
Figure 3:
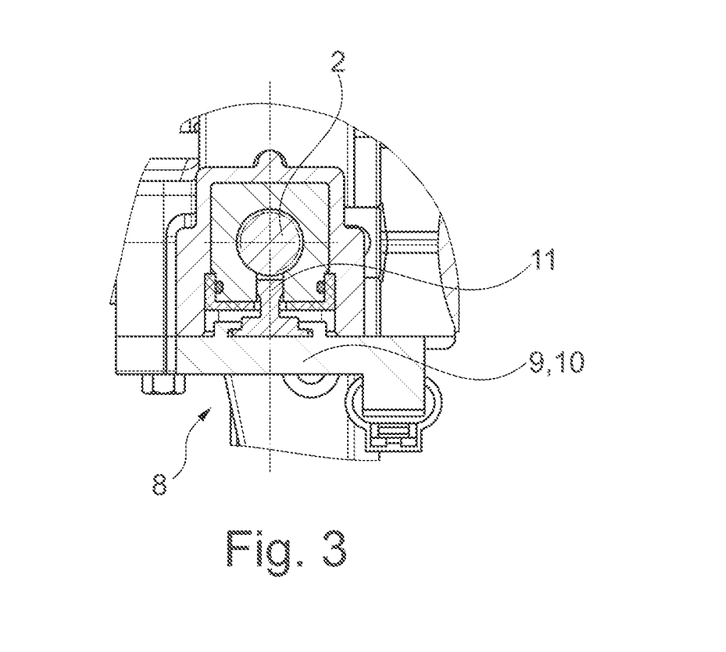
FIG. 3 shows the enlargement of the section of FIG. 2 in cross-section through the linear actuator.

An inductive linear travel sensor 8 is provided for determining a position of the pushrod 2 (FIGS. 2 and 3). A housing-side position receiver 9 is provided with a receiver section 10 along the longitudinal axis. A pushrod-side position transmitter 11 interacts with the position receiver 9. The position transmitter 11 fixed to the pushrod 2 moves along a longitudinal axis while the pushrod 2 is displaced and sweeps over the receiver section 10 of the position receiver 9. A plurality of coils are accommodated in the region of the receiver section 10. The receiver section 10 generates a magnetic field. The position transmitter 11 is formed of metal and is electrically conductive. When the position transmitter 11 passes through the receiver section 10, the amplitude and frequency of the oscillating circuit are changed. Based on these changes, a proper position detection of the pushrod 2 can be performed. This position detection is performed contactlessly.

Figure 4:
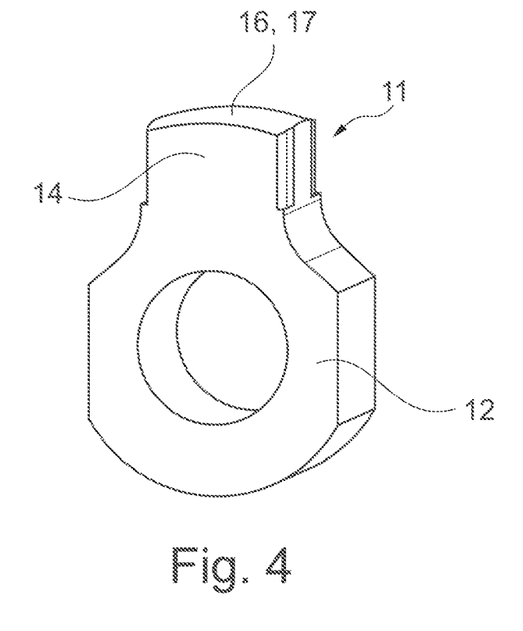
FIG. 4 shows a position transmitter of a linear travel sensor of the linear actuator as a single part in a perspective view.
Figures 5, 6:
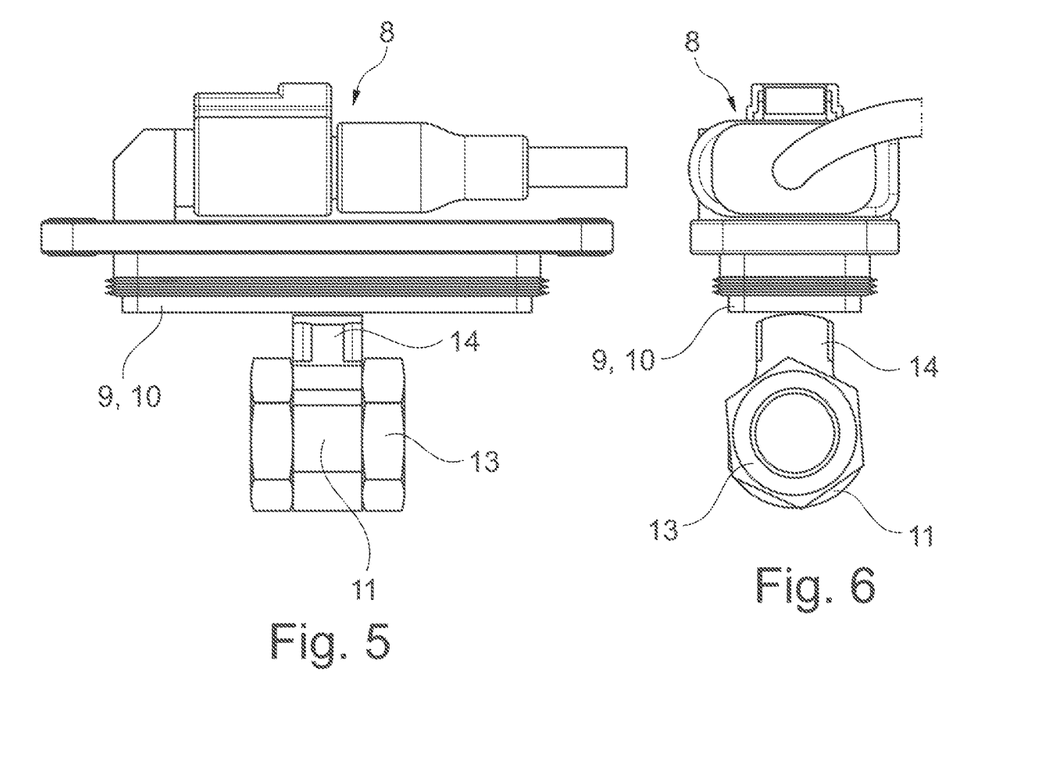
FIG. 5 shows the linear travel sensor of the linear actuator with an alternative position transmitter.
FIG. 6 shows another view of the linear travel sensor of FIG. 5.

FIGS. 4 to 6 show the linear travel sensor 8 with the position transmitter 11, which in this exemplary embodiment has an approximately ring-shaped securing section 12, which is pushed onto the pushrod 2 and fixed with lock nuts 13. On the outer circumference of the securing section 12, a pin 14 extends in the radial direction and projects into a longitudinal groove 15 of the linear travel sensor 8 in which the receiver section 10 of the position receiver 9 is accommodated. FIGS. 5 and 6 clearly show that the pin 14 has its free end facing the receiver section 10.

The pin 14 is designed to be curved at its free end with a transmitter contour 16 around a dimensional axis. The transmitter contour 16 is formed here by the peripheral contour of the pin 14 and a transmitter surface 17 at the free front end of the pin 14. In this example, the dimensional axis coincides with the longitudinal axis of the pushrod 2. The curvature of the transmitter surface 17 is partially cylindrical. Under a rotation of the position transmitter 11 around the longitudinal axis, the measurement result is not or only insignificantly influenced, because this curvature is at least approximately parallel to the direction of movement under this rotation.

The shape of the transmitter contour 16 varies in the other exemplary embodiments.

Figures 7, 8:
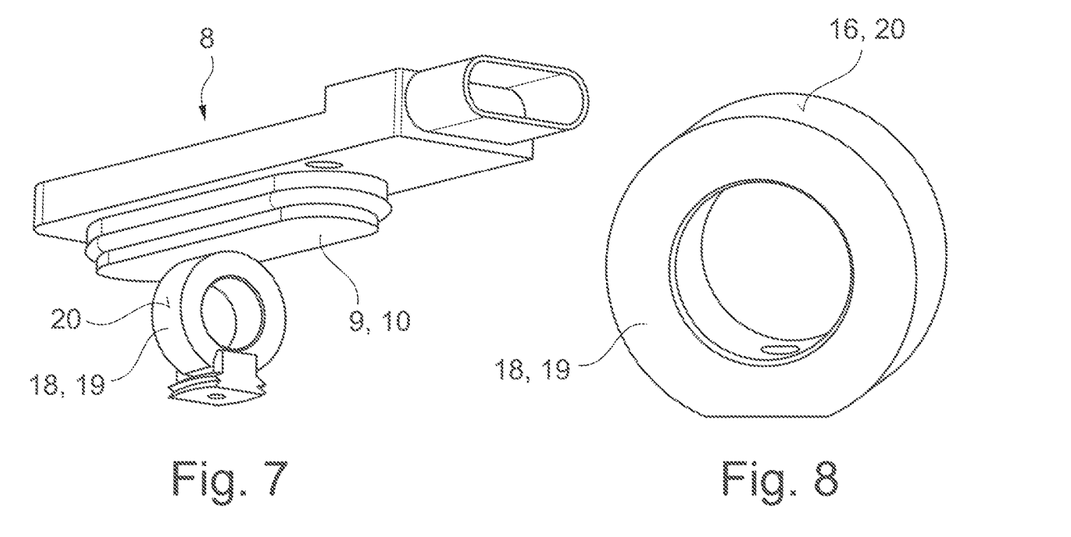
FIG. 7 shows the linear travel sensor in a perspective with an alternative position transmitter.
FIG. 8 shows the position transmitter of FIG. 7 as a single part.

FIGS. 7 and 8 show a variant with a position transmitter 18 formed as a ring 19. The ring 19 is fixed to the pushrod 2 in the same way as the ring-shaped securing section. The cylindrical lateral surface forms a transmitter surface 20 that is curved like the transmitter surface of the previously described exemplary embodiment.

Figure 9:
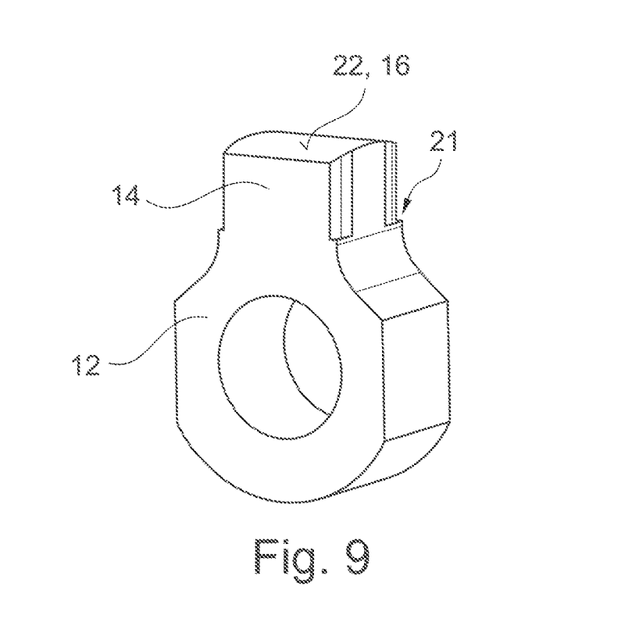
FIG. 9 shows another alternative position transmitter in a perspective view.
Figure 10:
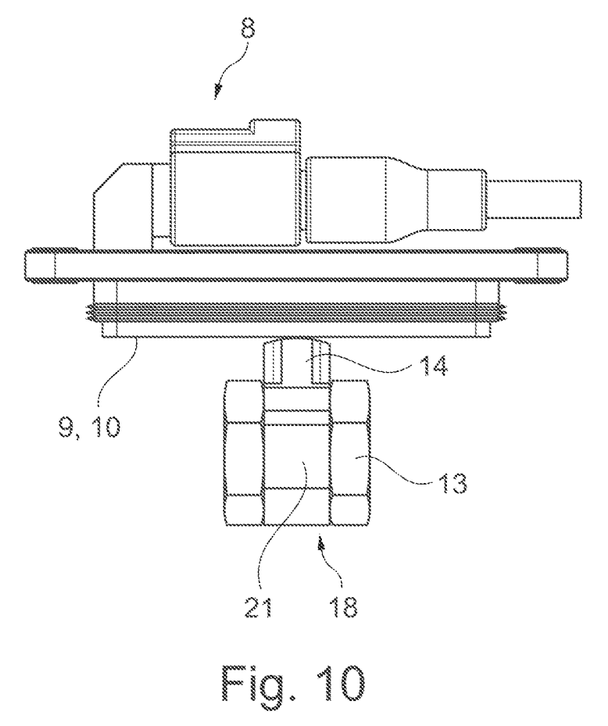
FIG. 10 shows the linear travel sensor with the position transmitter of FIG. 9.
Figure 11:
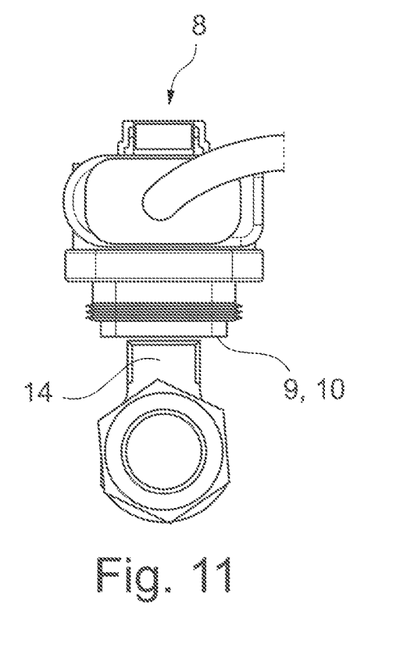
FIG. 11 shows another view of the linear travel sensor of FIG. 10.

FIGS. 9 to 11 show the linear travel sensor 8 with a further variant of a position transmitter 21, which differs from the position transmitter of the first exemplary embodiment only in that the transmitter surface 22 is curved about a dimensional axis arranged transverse to the longitudinal axis and transverse to the pin axis of the pin 14. This curvature is partially cylindrical. If the pushrod 2 tilts around this dimensional axis, the measurement result is not or only insignificantly influenced, because this curvature is at least approximately parallel to the direction of movement under this tilting.

Figure 12:
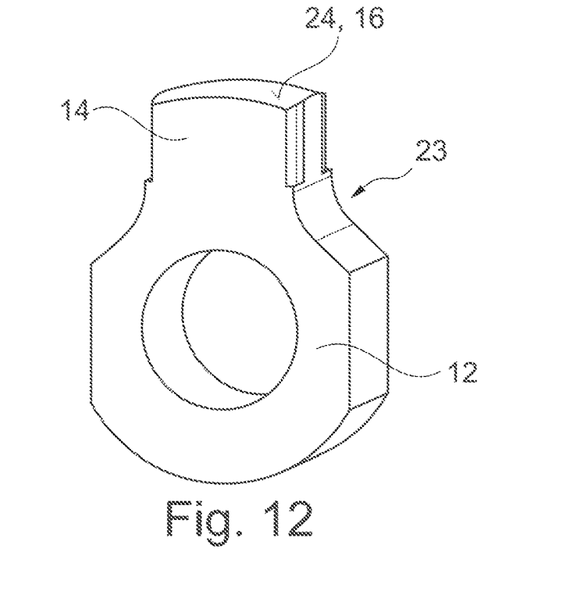
FIG. 12 shows another alternative position transmitter in a perspective view.
Figure 13:
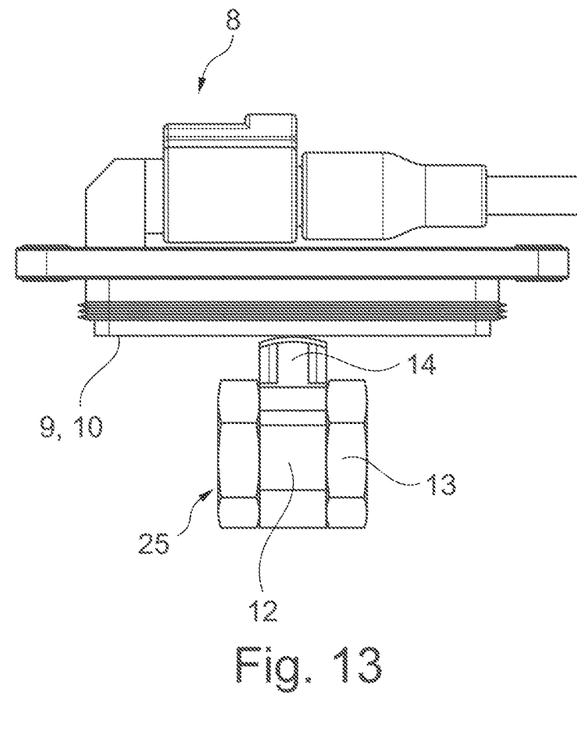
FIG. 13 shows the linear travel sensor with the position transmitter of FIG. 12.
Figure 14:
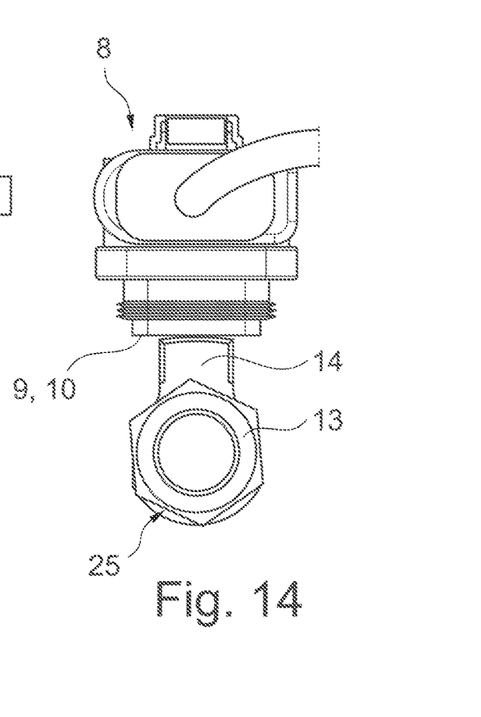
FIG. 14 shows another view of the linear travel sensor of FIG. 13.

The exemplary embodiment according to FIGS. 12 to 14 shows the linear travel sensor with a further alternative position transmitter 23, the crowned transmitter surface 24 of which combines the curvatures of the two transmitter surfaces 17 and 22 from the exemplary embodiments described above and in this way compensates for a tilt and a rotation of the pushrod 2 with regard to the measurement result.

Figure 15:
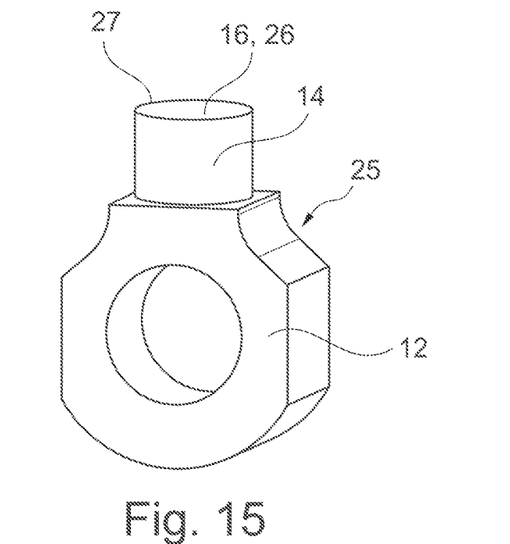
FIG. 15 shows another alternative position transmitter in a perspective view.
Figure 16:
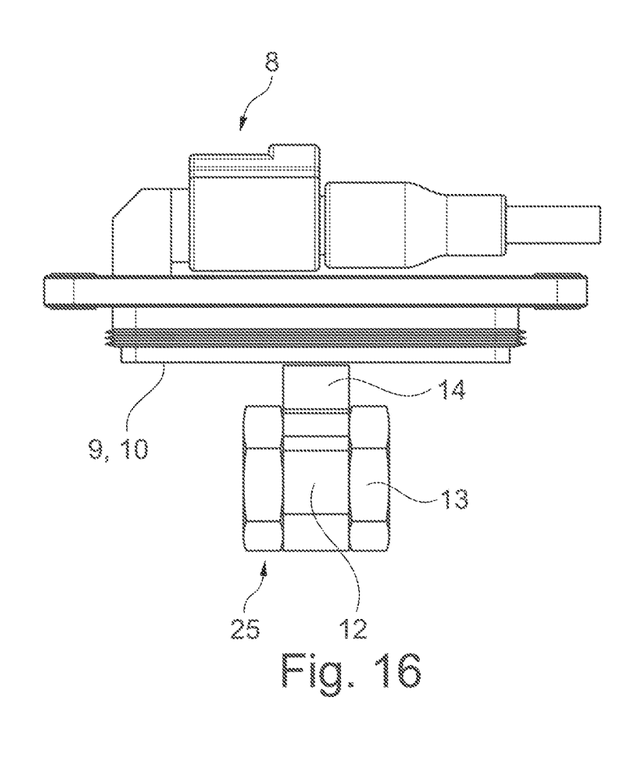
FIG. 16 shows the linear travel sensor with the position transmitter of FIG. 15.
Figure 17:
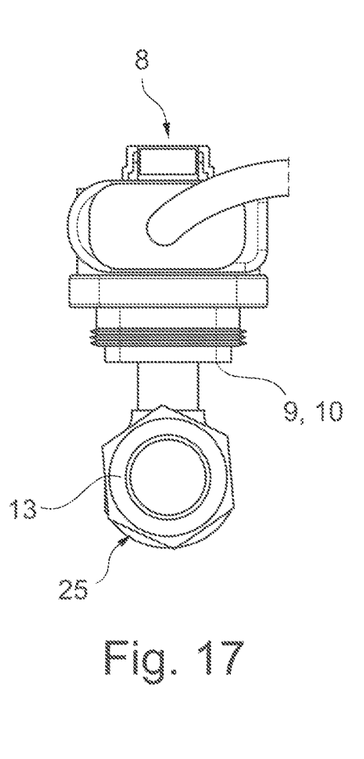
FIG. 17 shows another view of the linear travel sensor of FIG. 16.

The exemplary embodiment according to FIGS. 15 to 17 shows a position transmitter 25 that differs from all previously described exemplary embodiments in that the pin 14 is cylindrical and its transmitter contour 16 is formed by the planar transmitter surface 26 at the front end of the pin and the circularly curved peripheral contour 27 of the transmitter surface 26. The peripheral contour 27 is arranged around a dimensional axis that coincides with a pin axis. This variant is advantageous if tilting of the pushrod 2 is expected about an axis that roughly coincides with the pin axis.

Figure 18:
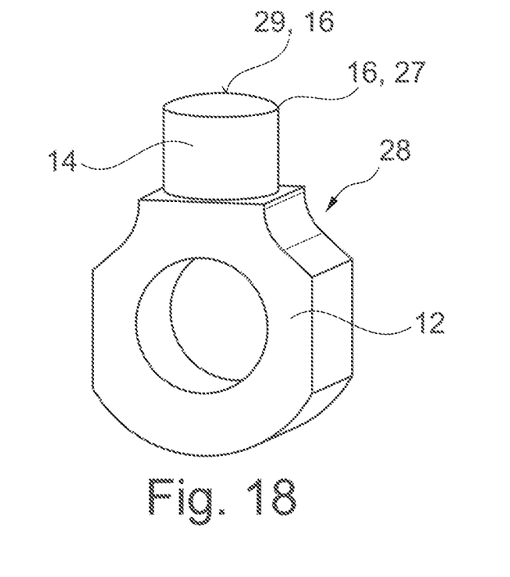
FIG. 18 shows another alternative position transmitter in a perspective view.
Figure 19:
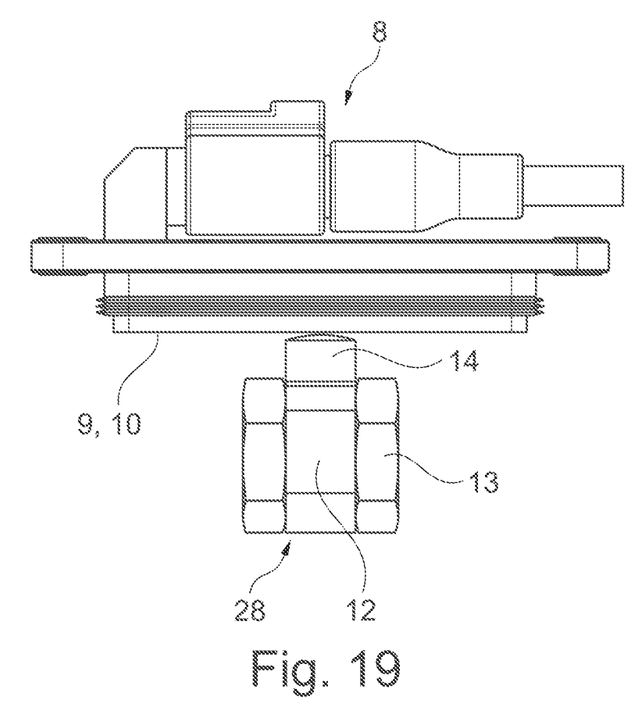
FIG. 19 shows the linear travel sensor with the position transmitter of FIG. 18.
Figure 20:
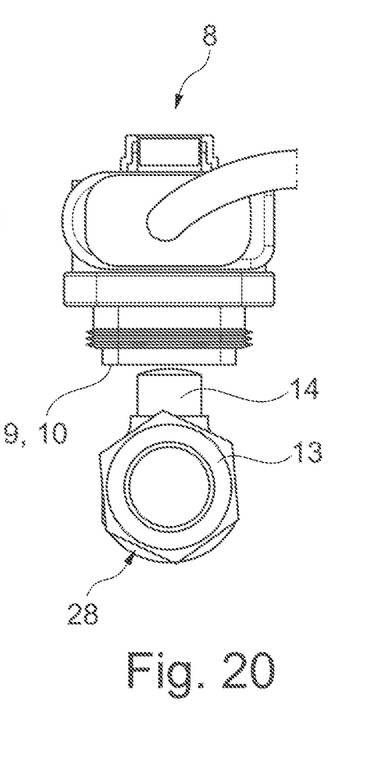
FIG. 20 shows another view of the linear travel sensor of FIG. 19.

The exemplary embodiment according to FIGS. 18 to 20 shows a position transmitter 28 that differs from the previously described exemplary embodiments in that the transmitter surface 29 is convexly crowned. The transmitter contour 16 is formed by the circular peripheral contour 27 and the crowned transmitter surface 29.

Figure 21:
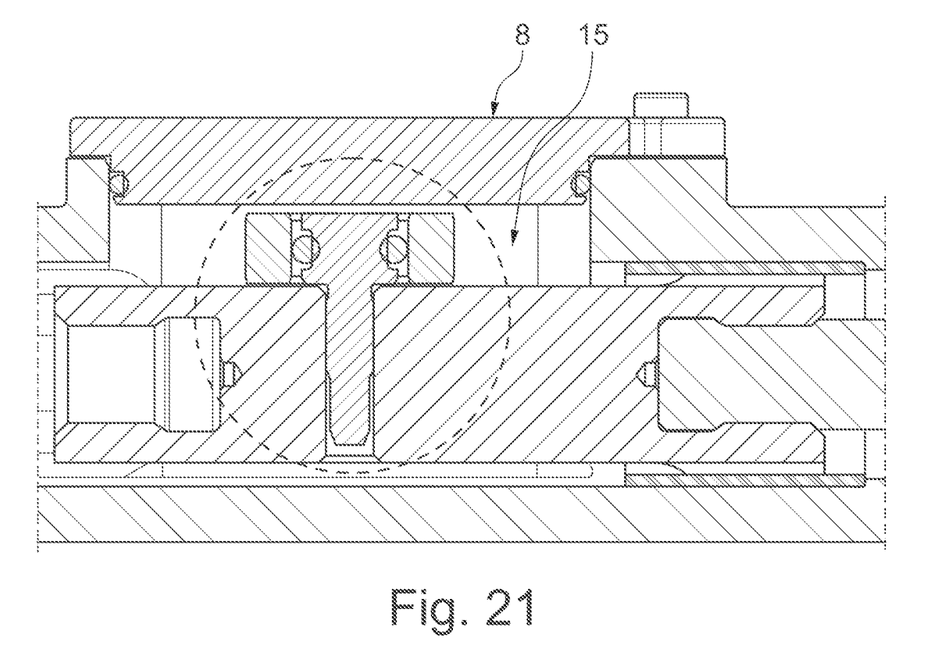
FIG. 21 shows an enlargement of a section as in FIG. 2 with an alternative position transmitter.
Figure 22:
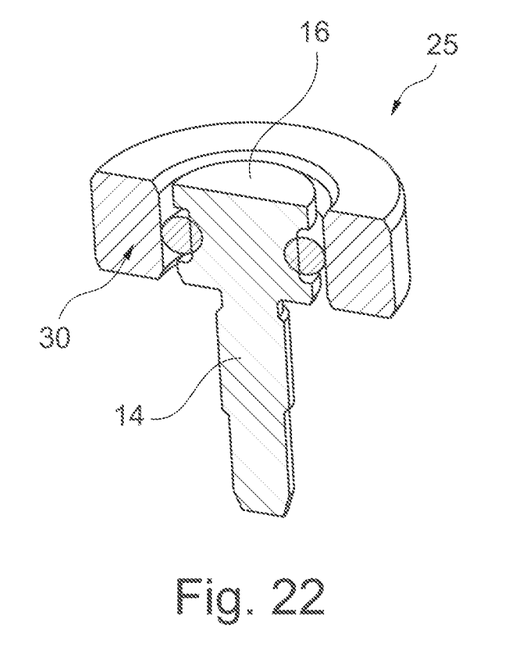
FIG. 22 shows the position transmitter of FIG. 21 in a perspective view.

The exemplary embodiment according to FIGS. 21 and 22 differs from the exemplary embodiment according to FIGS. 15 to 17 in that the cylindrical pin 14 is supported by means of a radial bearing 31 designed as a rolling bearing 30 and is guided along a longitudinal wall of the longitudinal groove 15.

LIST OF REFERENCE SYMBOLS

1 Housing
2 Pushrod
3 Electric motor
4 Screw drive
5 Nut
6 Threaded spindle
7 Fork head
8 Linear travel sensor
9 Position receiver
10 Receiver section
11 Position transmitter
12 Securing section
13 Lock nut
14 Pin
15 Longitudinal groove
16 Transmitter contour
17 Transmitter surface
18 Position transmitter
19 Ring
20 Transmitter surface
21 Position transmitter
22 Transmitter surface
23 Position transmitter
24 Transmitter surface
25 Position transmitter
26 Transmitter surface
27 Peripheral contour
28 Position transmitter
29 Transmitter surface
30 Rolling bearing
31 Radial bearing

What is claimed is:

1. A linear actuator, comprising:
a screw drive including a threaded spindle coupled to a pushrod,
a nut arranged on the threaded spindle,
an electric motor configured to rotate the nut so as to displace the threaded spindle and push rod together along a longitudinal axis,
a housing enclosing, the pushrod,
an inductive linear travel sensor configured for determining a position of the pushrod, the inductive linear travel sensor having:
a housing-side position receiver comprising a receiver section extending along the longitudinal axis, and
a pushrod-side position transmitter configured to interact contactlessly with the housing-side position receiver, the pushrod-side position transmitter constructed from an electrically conductive material and having a transmitter contour curved about at least one dimensional axis.

2. The linear actuator according to claim 1, wherein the transmitter contour is formed by: i) a transmitter surface facing the receiver section, and ii) a peripheral contour delimiting the transmitter surface, and at least one of the transmitter surface or the peripheral contour is curved about the at least one dimensional axis.

3. The linear actuator according to claim 2, wherein the peripheral contour is curved about a dimensional axis arranged transverse to the longitudinal axis.

4. The linear actuator according to claim 3, wherein the transmitter surface is configured to be planar and arranged parallel to the longitudinal axis.

5. The linear actuator according to claim 2, wherein the transmitter surface is curved about a dimensional axis arranged parallel to the longitudinal axis.

6. The linear actuator according to claim 2, wherein the transmitter surface is curved about a dimensional axis arranged transverse to the longitudinal axis.

7. The linear actuator according to claim 2, wherein the transmitter surface is convexly crowned.

8. The linear actuator according to claim 2, wherein the pushrod-side position transmitter has a cylindrical pin projecting transversely from the pushrod, and a free front end of with the cylindrical pin has the transmitter contour.

9. The linear actuator according to claim 8, wherein a free end face of the cylindrical pin forms the transmitter surface, and the transmitter surface is delimited by a circular peripheral contour.

10. The linear actuator according to claim 9, wherein the cylindrical pin engages in a housing-side longitudinal groove of the inductive linear travel sensor and is mounted therein via a radial bearing.

11. The linear actuator according to claim 1, wherein a displacement of the threaded spindle and pushrod is configured to move a wheel in a motor vehicle.

12. The linear actuator according to claim 1, utilized within a rear axle steering system.

13. A linear actuator, comprising:
a housing,
a pushrod at least partially enclosed by the housing,
a threaded spindle coupled to the pushrod,
a nut arranged on the threaded spindle,
an electric motor configured to rotate the nut such that rotary motion of the nut is converted to translational movement of the threaded spindle and pushrod along a longitudinal axis,
an inductive linear travel sensor having:
  a position receiver comprising a receiver section extending along the longitudinal axis, and
  a position transmitter constructed from an electrically conductive material having a transmitter contour curved about at least one dimensional axis, the position transmitter configured to interact contactlessly with the position receiver via the transmitter contour to determine a longitudinal position of the linear actuator.

14. The linear actuator of claim 13, wherein the position transmitter is attached to the pushrod and the inductive linear travel sensor is configured to determine a longitudinal position of the pushrod.

15. The linear actuator according to claim 13, wherein the transmitter contour is formed by: i) a transmitter surface facing the receiver section, and ii) a peripheral contour delimiting the transmitter surface, and at least one of the transmitter surface or the peripheral contour is curved about the at least one dimensional axis.

16. The linear actuator according to claim 15, wherein the peripheral contour is curved about a dimensional axis arranged transverse to the longitudinal axis.

17. The linear actuator of claim 15, wherein the transmitter surface is convexly crowned.

18. The linear actuator according to claim 15, wherein the transmitter surface is curved about a dimensional axis arranged parallel to the longitudinal axis.

19. The linear actuator according to claim 15, wherein the transmitter surface is curved about a dimensional axis arranged transverse to the longitudinal axis.

20. A linear actuator, comprising:
a housing enclosing a pushrod, the pushrod guided displaceably along a longitudinal axis,
an inductive linear travel sensor configured for determining a position of the pushrod, the inductive linear travel sensor having:
  a housing-side position receiver comprising a receiver section extending along the longitudinal axis, and
a pushrod-side position transmitter:
  configured to interact contactlessly with the housing-side position receiver,
  constructed from an electrically conductive material, and
  having:
    a ring-shaped securing section fully circumscribing the pushrod, the ring-shaped securing section configured to fix the pushrod-side position transmitter to the pushrod, and
    a transmitter contour curved about at least one dimensional axis.

* * * * *